United States Patent
Lightman

(10) Patent No.: US 9,885,127 B2
(45) Date of Patent: Feb. 6, 2018

(54) PROCESSES FOR USING RECYCLED WASTE COTTON MATERIAL IN PRODUCING A TEXTILE PRODUCT AND TEXTILE PRODUCTS PRODUCED FROM WASTE COTTON MATERIAL

(71) Applicant: PARADIGM ONE, LLC, Tampa, FL (US)

(72) Inventor: Elliott D. Lightman, Tampa, FL (US)

(73) Assignee: PARADIGM ONE, LLC, Tampa, FL (US)

( * ) Notice: Subject to any disclaimer, the term of this patent is extended or adjusted under 35 U.S.C. 154(b) by 88 days.

(21) Appl. No.: 14/831,332

(22) Filed: Aug. 20, 2015

(65) Prior Publication Data

US 2016/0002829 A1    Jan. 7, 2016

Related U.S. Application Data

(63) Continuation-in-part of application No. 13/085,201, filed on Apr. 12, 2011, now Pat. No. 9,133,570.
(Continued)

(51) Int. Cl.
*D01G 11/00* (2006.01)
*D04H 1/04* (2012.01)
(Continued)

(52) U.S. Cl.
CPC .......... *D01G 11/00* (2013.01); *D01G 21/00* (2013.01); *D01H 1/025* (2013.01); *D02G 3/042* (2013.01);
(Continued)

(58) Field of Classification Search
None
See application file for complete search history.

(56) References Cited

U.S. PATENT DOCUMENTS 2,840,881 A    7/1958  Wayne
4,300,267 A    11/1981 Winch et al.
(Continued)

FOREIGN PATENT DOCUMENTS

WO    WO 2011/130276    10/2011

OTHER PUBLICATIONS

Thornley, "Cotton Waster: Its Production, Manipulation & Uses", Second Edition, Scott, Greenwood & Son, May 1921.
(Continued)

*Primary Examiner* — Shawnda McKinnon
(74) *Attorney, Agent, or Firm* — Jenkins, Wilson, Taylor & Hunt, P.A.

(57) ABSTRACT

A process for using recycled waste cotton material to produce a textile product is provided. The process can include collecting different categories of waste cotton material from a variety of textile formation processes. The process can also include selecting specific categories of waste cotton material to be blended together depending on the textile product to be produced. In the process, sequence of cleaning, opening and blending processing steps can be selected to be used in making a yarn depending on the textile product to be produced. The selected specific categories of waste cotton material can be cleaned, opened and blended into blended cotton fibers. The blended cotton fibers can then be processed into the textile product to be produced. Thus, a textile product can be provided that includes yarn that can have at least three different categories of waste cotton material that are from textile formation processes.

9 Claims, 11 Drawing Sheets

Related U.S. Application Data

(60) Provisional application No. 61/323,193, filed on Apr. 12, 2010.

(51) Int. Cl.
| | |
|---|---|
| *D01H 1/02* | (2006.01) |
| *D02G 3/04* | (2006.01) |
| *D01G 21/00* | (2006.01) |
| *D04H 1/425* | (2012.01) |
| *D04H 1/4274* | (2012.01) |
| *D01G 13/00* | (2006.01) |
| *D01H 4/00* | (2006.01) |
| *D01G 11/04* | (2006.01) |

(52) U.S. Cl.
CPC ............... *D04H 1/04* (2013.01); *D04H 1/425* (2013.01); *D04H 1/4274* (2013.01); *D01G 11/04* (2013.01); *D01G 13/00* (2013.01); *D01H 4/00* (2013.01); *D10B 2201/02* (2013.01); *Y02W 30/66* (2015.05); *Y02W 30/667* (2015.05); *Y10T 428/249921* (2015.04)

(56) References Cited

U.S. PATENT DOCUMENTS

| | | | |
|---|---|---|---|
| 4,301,573 | A | 11/1981 | Gunter et al. |
| 4,914,787 | A | 4/1990 | Leifeld et al. |
| 5,331,801 | A | 7/1994 | Heifetz |
| 5,369,861 | A | 12/1994 | Ball et al. |
| 9,133,570 | B2 | 9/2015 | Lightman |
| 2002/0124366 | A1 | 9/2002 | Hirsch |

OTHER PUBLICATIONS

Fiori et al. "Effect of Cotton Fiber Strength on Single Yarn Properties and on Processing Behavior", Textile Research Journal, vol. 24, No. 6, Jun. 1954, pp. 503.

Balthie, "The Reclamation and Reprocessing of Cotton Wastes Produced During Yarn Preparation", South African Wool & Textiles Research Institute of CSIR, Sawtri Special Publication, Nov. 1984.

Langley et al., "Recycling and Reuse of Mixed Fiber Fabric Remants", Technical Report #17, Chelsea Center for Recylcing & Economic Development, Apr. 2000.

Oxenham ("Innovations in spun yarn technologies—present and future", Indian Journal of Fibre and Textile Research, vol. 31, Mar. 2006, pp. 116-124).

International Search Report and Written Opinion for PCT/US2011/032124 dated Apr. 12, 2011.

Restriction Requirement for U.S. Appl. No. 13/085,201 dated Sep. 19, 2013.

Non-Final Office Action for U.S. Appl. No. 13/085,201 dated Nov. 8, 2013.

Final Office Action for U.S. Appl. No. 13/085,201 dated Jul. 15, 2014.

Advisory Action for U.S. Appl. No. 13/085,201 dated Dec. 4, 2014.

Non-Final Office Action for U.S. Appl. No. 13/085,201 dated Jan. 16, 2015.

Interview Summary for U.S. Appl. No. 13/085,201 dated Mar. 11, 2015.

Final Office Action for U.S. Appl. No. 13/085,201 dated May 19, 2015.

Notice of Allowance for U.S. Appl. No. 13/085,201 dated Jul. 8, 2015.

Turner, "The Foundations of Yarn-Strength and Yarn Extension . . . ," *Journal of the Textile Institute Transactions*, vol. 19, Iss. 7, pp. T286-T314, DOI:10.1080/19447022808661460, http://dx.doi.org/10.1080/19447022808661460 (1928).

FIGURE 2A

INSTITUTIONAL TOWELS

| End Product | Yarn Type | Combed Noil | Combed Waste Yarn | Ring Spinning Waste Fiber | Ring Spun Waste Yarn | Carding Waste | Opening Waste | Roving Waste | Open End Spinning Waste Fiber | Open End Waste Yarn | Knitting Waste Yarn | Knitting Waste Fiber | Weaving Waste Yarn | White or Natural Knit Cutting Waste | White or Natural Woven Cutting Waste | Dyed Knit Cutting Scraps | Dyed Woven Cutting Scraps | Virgin Cotton | Polyester |
|---|---|---|---|---|---|---|---|---|---|---|---|---|---|---|---|---|---|---|---|
| 100% Cotton 10#/doz. Hospital Bath | 100% Cotton 10/1 1250 CSP | | | 15.0% | 15.0% | 15.0% | 5.0% | 15.0% | 10.0% | 15.0% | | | | 10.0% | | | | | |
| | 100% Cotton 14/1 1400 CSP | 15.0% | 10.0% | 15.0% | 15.0% | 10.0% | | 15.0% | 10.0% | | | | | 10.0% | | | | | |
| | 100% Cotton 16/1 1400 CSP | 15.0% | 10.0% | 15.0% | 15.0% | 10.0% | | 15.0% | 10.0% | | | | | 10.0% | | | | | |
| 86% Cotton/14% Poly 10.5#/doz. Bath | 10/1 Blend | | 15.0% | 15.0% | 20.0% | | | | | | | | | | | | | | 50.0% |
| | 100% Cotton 12/1 1250 CSP | 15.0% | 10.0% | 15.0% | 15.0% | 10.0% | | 15.0% | 10.0% | | | | | 10.0% | | | | | |
| | 100% Cotton 14/1 1250 CSP | 20.0% | 20.0% | 15.0% | 15.0% | 10.0% | | 10.0% | 10.0% | | | | | | | | | | |
| 100% Cotton 17#/doz. Hotel Bath | 100% Cotton 10/1 1600 CSP | 20.0% | 20.0% | 20.0% | 20.0% | 20.0% | | | | | | | | | | | | | |
| | 100% Cotton 12/1 1600 CSP | 30.0% | 20.0% | 20.0% | 20.0% | 10.0% | | | | | | | | | | | | | |
| | 100% Cotton 10/1 1800 CSP | 30.0% | 30.0% | 20.0% | 20.0% | | | | | | | | | | | | | | |
| 90% Cotton/10% Poly 17#/doz. Hotel Bath | 10/1 Blend | 30.0% | 20.0% | 10.0% | | | | | | | | | | | | | | | 40.0% |
| | 100% Cotton 14/1 1600 CSP | 30.0% | 30.0% | 20.0% | 20.0% | | | | | | | | | | | | | | |
| | 100% Cotton 10/1 1800 CSP | 30.0% | 30.0% | 20.0% | 20.0% | | | | | | | | | | | | | | |
| 100% Cotton 17#/doz. Hotel Bath | 100% Cotton 10/1 1600 CSP | 40.0% | 20.0% | 20.0% | 20.0% | | | | | | | | | | | | | | |
| | 100% Cotton 10/1 1800 CSP | 30.0% | 20.0% | 20.0% | 20.0% | 10.0% | | | | | | | | | | | | | |
| | 100% Cotton 14/1 1800 CSP | 40.0% | 20.0% | 20.0% | 20.0% | | | | | | | | | | | | | | |
| 100% Cotton 17#/doz. super soft micro | 100% Cotton 10/1 1800 CSP | 50.0% | 20.0% | | | | | | | | | | | | | | | 30.0% | |
| super soft pile yarn | 100% Cotton 12/1 1800 CSP | 50.0% | 20.0% | | | | | | | | | | | | | | | 30.0% | |

FIGURE 2B

CONSUMER TOWELS

| End Product | Yarn Type | Categories of Cotton Waste and/or Fibers |||||||||||||||||
|---|---|---|---|---|---|---|---|---|---|---|---|---|---|---|---|---|---|---|
| | | Combed Noil | Combed Waste Yarn | Ring Spinning Waste Fiber | Ring Spun Waste Yarn | Carding Waste | Opening Waste | Roving Waste | Open End Spinning Waste Fiber | Open End Waste Yarn | Knitting Waste Yarn | Knitting Waste Fiber | Weaving Waste Yarn | White or Natural Knit Cutting Waste | White or Natural Woven Cutting Waste | Dyed Knit Cutting Scraps | Dyed Woven Cutting Scraps | Virgin Cotton | Polyester |
| 100% Cotton 14#/doz. Standard Bath | 100% Cotton 12/1 1800 CSP | 40.0% | 30.0% | 20.0% | 10.0% | | | | | | | | | | | | | | |
| | 100% Cotton 12/1 1600 CSP | 30.0% | 20.0% | 20.0% | 20.0% | 10.0% | | | | | | | | | | | | | |
| | 100% Cotton 14/1 1600 CSP | 20.0% | 20.0% | 20.0% | 20.0% | 20.0% | | | | | | | | | | | | | |
| 100% Cotton 17#/doz. Micro | 100% Cotton 12/1 1800 CSP | 30.0% | 20.0% | 20.0% | | | | | | | | | | | | | | 30.0% | |
| super soft pile yarn | 100% Cotton 16/1 1800 CSP | 40.0% | 30.0% | | | | | | | | | | | | | | | 30.0% | |
| 100% Cotton 16#/doz. Micro | 100% Cotton 10/1 1800 CSP | 50.0% | 20.0% | | | | | | | | | | | | | | | 30.0% | |
| | 100% Cotton 10/1 1600 CSP | 40.0% | 20.0% | | | | | | | | | | | | | | | 30.0% | |
| super soft pile yarn | 100% Cotton 20/1 | 70.0% | | | | | | | | | | | | | | | | 30.0% | |
| | 100% Cotton 14/1 SS 1800 CSP | 50.0% | 20.0% | | | | | | | | | | | | | | | 30.0% | |

FIGURE 2C

KNIT FABRICS FOR APPAREL

| End Product | Yarn Type | Categories of Cotton Waste and/or Fibers | | | | | | | | | | | | | | | | | |
|---|---|---|---|---|---|---|---|---|---|---|---|---|---|---|---|---|---|---|
| | | Combed Noil | Combed Waste Yarn | Ring Spinning Waste Fiber | Ring Spun Waste Yarn | Carding Waste | Opening Waste | Roving Waste | Open End Spinning Waste Fiber | Open End Waste Yarn | Knitting Waste Yarn | Knitting Waste Fiber | Weaving Waste Yarn | White or Natural Knit Cutting Waste | White or Natural Woven Cutting Waste | Dyed Knit Cutting Scraps | Dyed Woven Cutting Scraps | Virgin Cotton | Polyester |
| Jersey 190gsm | 100% Cotton 20/1 | 40.0% | 30.0% | | | | | | | | | 10.0% | | 20.0% | | | | | |
| Jersey 160gsm | 100% Cotton 20/1 | 60.0% | | | | | | | | | | 10.0% | | 30.0% | | | | | |
| Jersey 135gsm | 100% Cotton 30/1 | 80.0% | | | | | | | | | | | | | | | | 20.0% | |
| Pique 190gsm | 100% Cotton 20/1 | 40.0% | 20.0% | | | | | | | | | 10.0% | | 30.0% | | | | | |
| Pique 220gsm | 100% Cotton 20/1 | 50.0% | 20.0% | | | | | | | | | 10.0% | | 20.0% | | | | | |
| Jersey 190gsm, Yarn-Dye Stripe | 100% Cotton 20/1 | | | | | | | | | | | | | | 20.0% | 80.0% | | | |

FIGURE 2D

SHEETING FOR APPAREL & HOSPITALITY

| End Product | Yarn Type | Combed Noil | Combed Waste Yarn | Ring Spinning Waste Fiber | Ring Spun Waste Yarn | Carding Waste | Opening Waste | Roving Waste | Open End Spinning Waste Fiber | Open End Waste Yarn | Knitting Waste Yarn | Knitting Waste Fiber | White or Natural Knit Cutting Waste | White or Natural Woven Cutting Waste | Dyed Knit Cutting Scraps | Dyed Woven Cutting Scraps | Virgin Cotton | Polyester |
|---|---|---|---|---|---|---|---|---|---|---|---|---|---|---|---|---|---|---|
| T-160 | 100% Cotton 24/1 | 35.0% | 35.0% | | | | | | | | | | | | | | 30.0% | |
| T-200 | 100% Cotton 30/1 | 70.0% | | | | | | | | | | | | | | | 30.0% | |
| T-250 | 100% Cotton 34/1 | 60.0% | | | | | | | | | | | | | | | 40.0% | |
| T-160 Blend | 60% Cotton/ 40% Poly 24/1 | 40.0% | | | | | | | | | | | | | | | | 60.0% |
| T-200 Blend | 60% Cotton/ 40% Poly 30/1 | 40.0% | | | | | | | | | | | | | | | | 60.0% |
| 20/1 Yarn Dye | 100% Cotton 20/1 | | | | | | | | | | | | | | | 100% | | |

Categories of Cotton Waste and/or Fibers

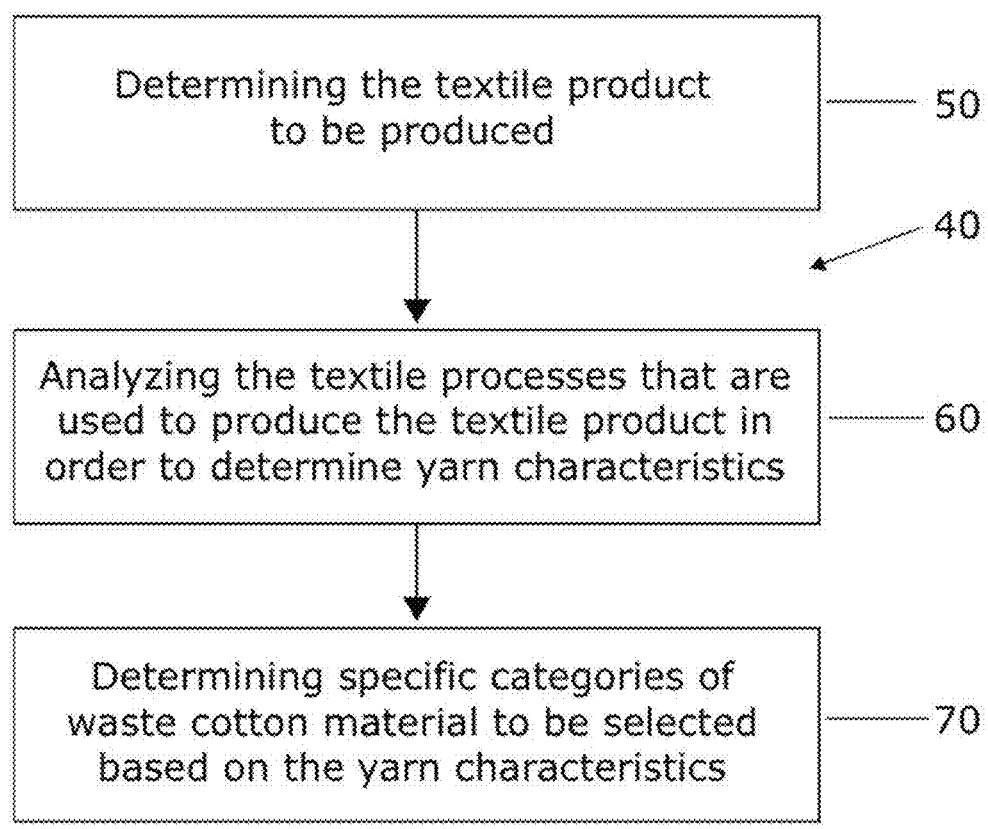

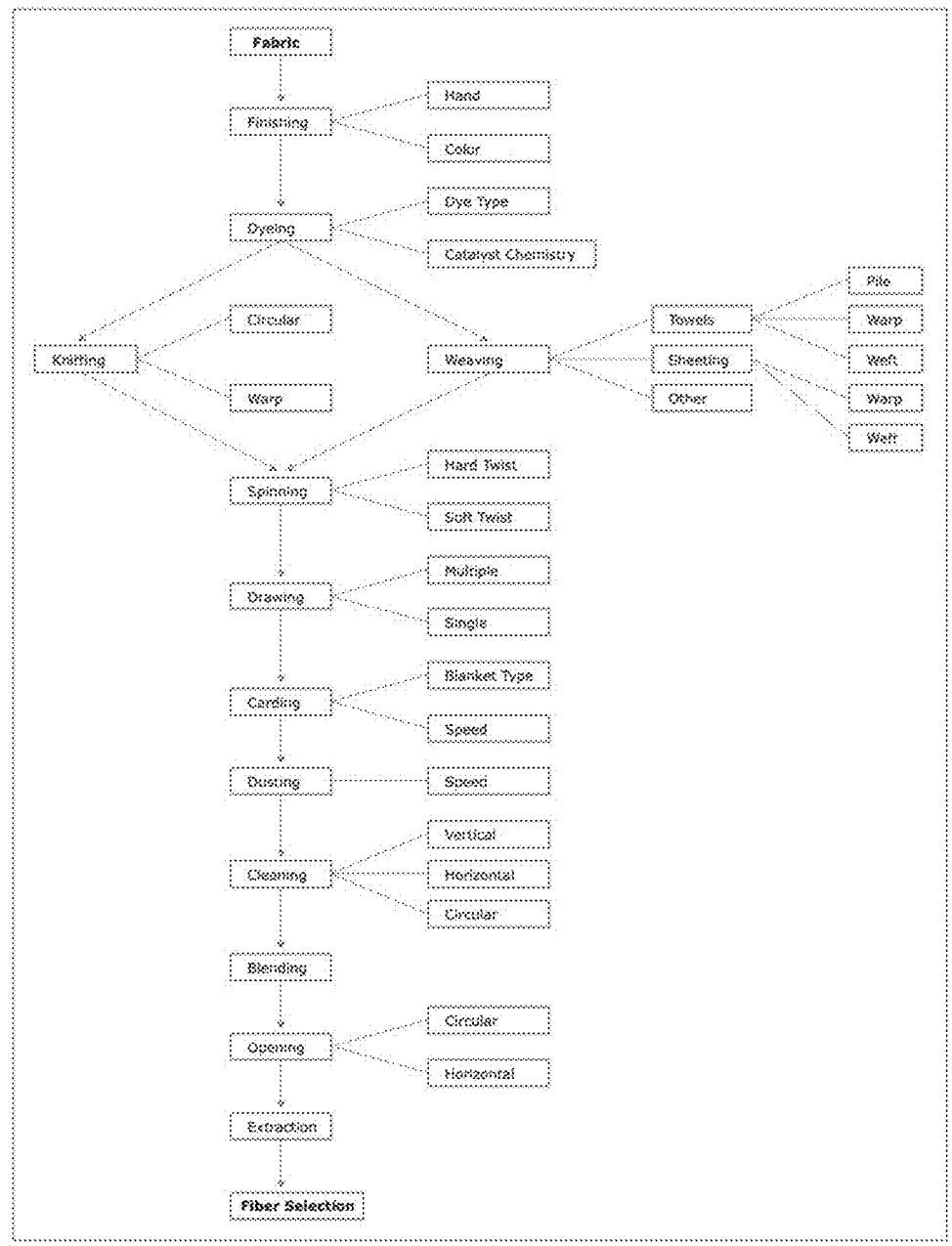

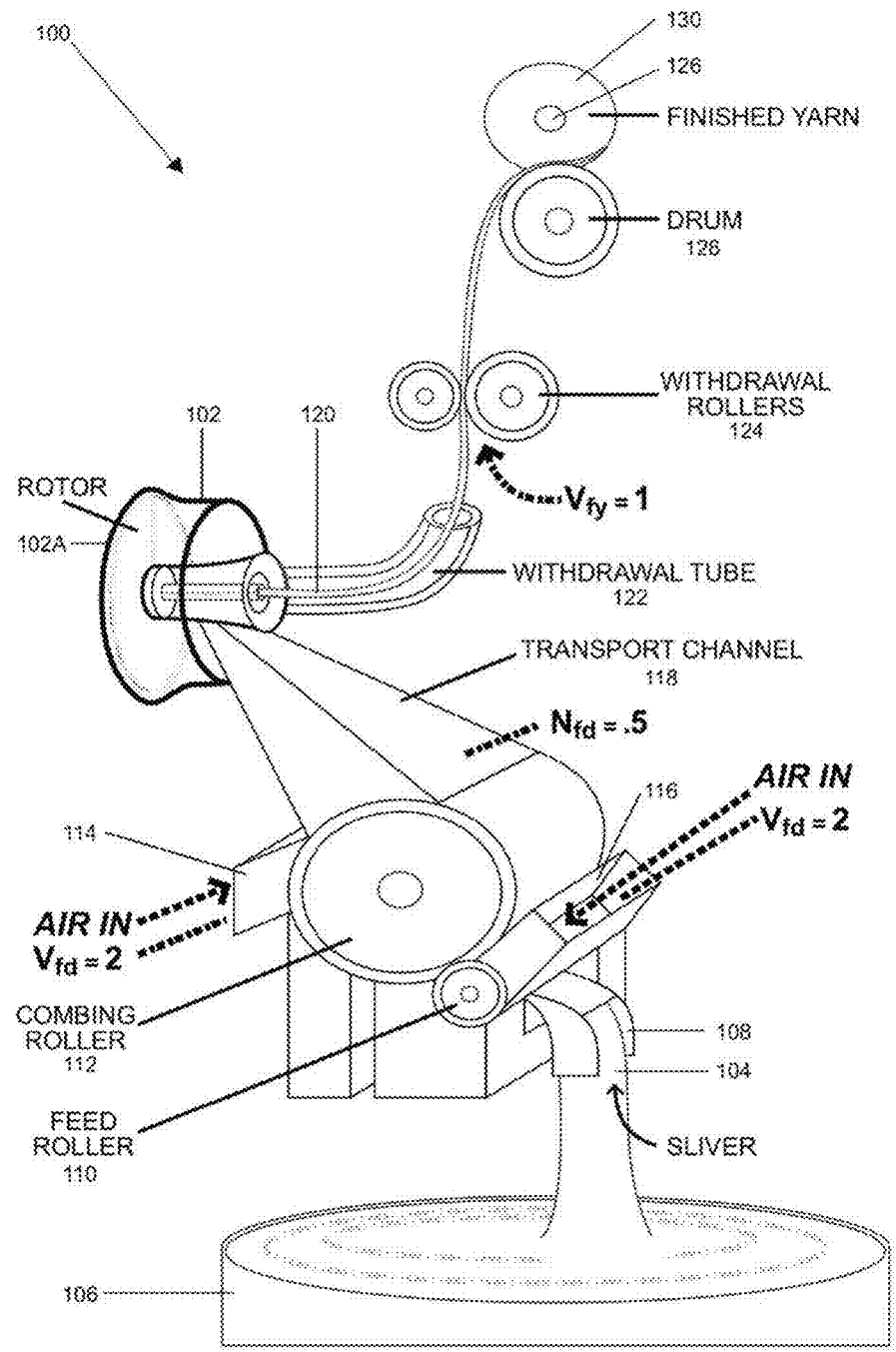

Figure 6A
RETAIL TOWELS

Figure 6B
KNIT FABRICS FOR APPAREL

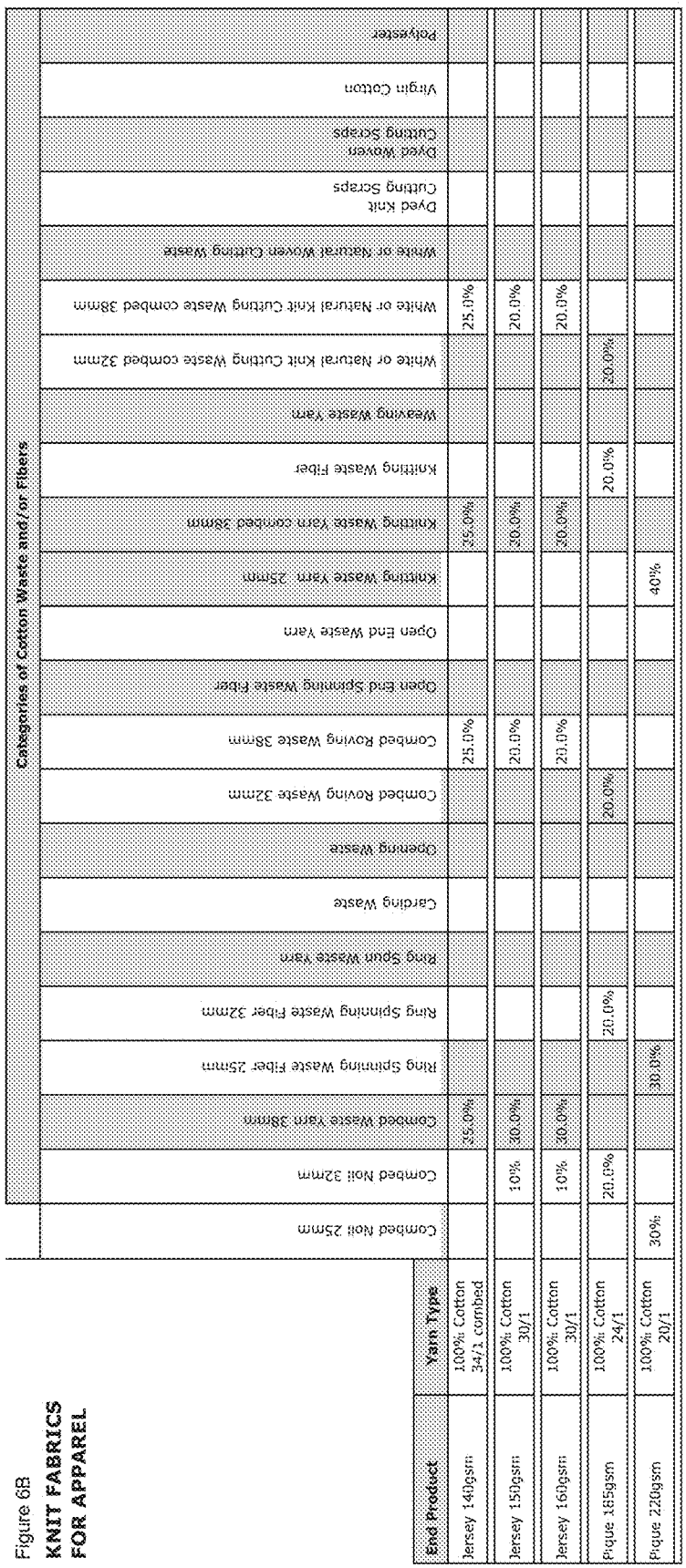

| End Product | Yarn Type | Combed Noil 25mm | Combed Noil 32mm | Combed Waste Yarn 38mm | Ring Spinning Waste Fiber 25mm | Ring Spinning Waste Fiber 32mm | Ring Spun Waste Yarn | Carding Waste | Opening Waste | Combed Roving Waste 32mm | Combed Roving Waste 38mm | Open End Spinning Waste Fiber | Open End Waste Yarn | Knitting Waste Yarn 25mm | Knitting Waste Yarn combed 38mm | Knitting Waste Fiber | Weaving Waste Yarn | White or Natural Knit Cutting Waste combed 32mm | White or Natural Knit Cutting Waste combed 38mm | White or Natural Woven Cutting Waste | Dyed Knit Cutting Scraps | Dyed Woven Cutting Scraps | Virgin Cotton | Polyester |
|---|---|---|---|---|---|---|---|---|---|---|---|---|---|---|---|---|---|---|---|---|---|---|---|---|
| Jersey 140gsm | 100% Cotton 34/1 combed | | | 35.0% | | | | | | | 25.0% | | | | 25.0% | | | | 25.0% | | | | | |
| Jersey 150gsm | 100% Cotton 30/1 | | 10% | 30.0% | | | | | | | 20.0% | | | | 30.0% | | | | 20.0% | | | | | |
| Jersey 160gsm | 100% Cotton 30/1 | | 10% | 30.0% | | | | | | | 20.0% | | | | 30.0% | | | | 20.0% | | | | | |
| Pique 185gsm | 100% Cotton 24/1 | | 20.0% | | | 20.0% | | | | 20.0% | | | | | | 20.0% | | 20.0% | | | | | | |
| Pique 220gsm | 100% Cotton 20/1 | 30% | | | 30.0% | | | | | | | | | 40% | | | | | | | | | | |

Figure 6C
BED SHEETING FOR RETAIL/CONSUMERS

| End Product | Yarn Type | Categories of Cotton Waste and/or Fibers |||||||||||||||||||
|---|---|---|---|---|---|---|---|---|---|---|---|---|---|---|---|---|---|---|---|
| | | Combed Noil | Combed Waste Yarn 38 mm | Ring Spinning Waste Fiber | Ring Spun Waste Yarn | Carding Waste | Opening Waste | Roving Combed Waste 38mm | Open End Spinning Waste Fiber | Open End Waste Yarn | Knitting Waste Yarn | Knitting Waste Fiber | Weaving Waste Yarn | White or Natural Combed Knit Cutting Waste 38mm | White or Natural Woven Cutting Waste | Dyed Knit Cutting Scraps | Dyed Woven Cutting Scraps | Virgin Cotton | Polyester |
| T-300 | 100% Cotton 60 x 60 2400 CSP | | 35.0% | | | | | 35.0% | | | | | | 30.0% | | | | | |
| T-400 | 100% Cotton 60 x 80 2400 CSP | | 35.0% | | | | | 35.0% | | | | | | 30.0% | | | | | |

PROCESSES FOR USING RECYCLED WASTE COTTON MATERIAL IN PRODUCING A TEXTILE PRODUCT AND TEXTILE PRODUCTS PRODUCED FROM WASTE COTTON MATERIAL

CROSS REFERENCE TO RELATED APPLICATIONS

This application is a continuation-in-part of U.S. patent application Ser. No. 13/085,201, filed Apr. 12, 2011, which claims the benefit of and priority to U.S. Provisional Patent Application Ser. No. 61/323,193, filed Apr. 12, 2010, the disclosures of which are incorporated herein by reference in their entirety.

TECHNICAL FIELD

The subject matter described herein relates to the use of waste cotton material that can be used in forming other textile products. More particularly, the subject matter described herein relates to a cotton regeneration process for using recycled waste cotton material in producing a textile product and textiles products produced from such waste cotton material.

BACKGROUND

Up to 40% of cotton grown is wasted between the harvest and the manufacturing of garments and textiles. In the past, most of this waste went directly into landfills or was incinerated. By recycling cotton waste, not only can landfill space be conserved, but the amount of land, water, energy, pesticides, and human labor that goes into cotton production can be reduced.

SUMMARY

The presently disclosed subject matter discloses a cotton regeneration process for using recycled waste cotton material in producing a textile product and textiles products produced from such waste cotton material. It is an object of the presently disclosed subject matter to enable the creation of garments and home and commercial textiles from pre-consumer waste cotton. For example, the creation of garments and home and commercial textile products can be performed using up to 100% pre-consumer waste cotton.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIGS. 2A-2D are charts illustrating embodiments of formulas of specific categories of fibers including fibers from waste cotton material to be blended together depending on a textile product to be produced according to the subject matter disclosed herein;

FIG. 3 is a flow chart that illustrates an example of a process for determining specific categories of waste cotton material to be selected and blended together depending on a textile product to be produced according to an embodiment of the subject matter described herein;

FIG. 4 is a flow chart that illustrates examples of possible textile processes and process characteristics from those processes to consider in determining specific categories of waste cotton material to be selected and blended together depending on a textile product to be produced according to an embodiment of the subject matter described herein;

FIG. 5 illustrates a perspective view of an embodiment of a portion of an open-end spinning that can be used to spin yarn according to an embodiment of the subject matter described herein; and FIGS. 6A-6C are charts illustrating embodiments of formulas of specific categories of fibers including fibers from waste cotton material to be blended together depending on a textile product to be produced according to the subject matter disclosed herein.

DETAILED DESCRIPTION

Figure 1:
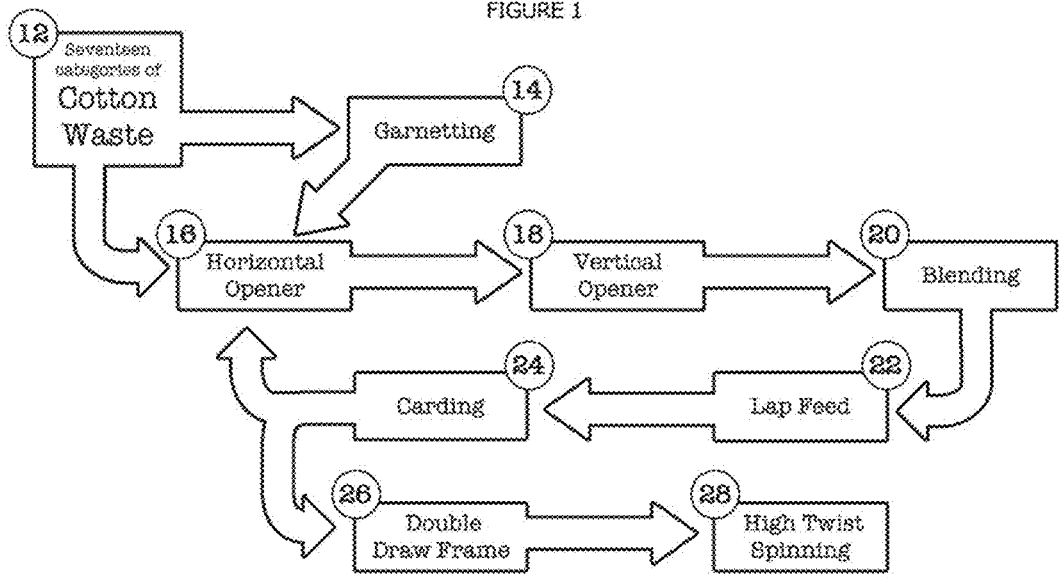
FIG. 1 is a flow chart that illustrates block diagrams of process steps according to an embodiment of the subject matter described herein.

Reference will now be made in detail to possible embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein covers such modifications and variations.

The process of the creating textiles from pre-consumer waste cotton of the presently disclosed subject matter can result in first quality textile fabrics, such as knit and woven fabrics, produced from yarns having cotton counts of about 8/1's up to about 40/1's or higher, that can be dyed and finished to any specification. The process can incorporate the steps necessary to create finished garments and/or other textile products from waste cotton material. These steps can include collecting cotton waste, sorting, yarn production, knitting or weaving, dyeing and finishing, and sewing.

To enable the creation of garments and home and commercial textiles from pre-consumer waste cotton that can result in first quality textile fabrics made from yarns having cotton counts of about 8/1 up to about 40/1 or higher that can be dyed and finished to any specification, a process can be used that categorizes textile mill, or textile plant, waste into different categories based on where the waste is collected. For example, the waste can be classified into different categories based on the different processing areas from which it is collected. Each type of process from where the waste is collected can be a process that can be used in making cotton textiles from opening to fabric formation. The waste from each process generally possesses its own distinct properties. In at least one example, the waste can be categorized into seventeen (17) categories that each can represent a type of process from where the waste is collected.

In some embodiments, the disclosed processes comprise categorizing/sorting waste fibers by analyzing the waste fiber similar to or even the same as would be done for virgin cotton. For example, the stable length, micronaire, and/or strength of the waste fibers can be analyzed using similar techniques as would be used for virgin cotton. By analyzing and categorizing waste fibers, and thereby selecting the best fibers, finer and stronger yarns can be produced from waste and/or recycled fibers, including in some embodiments yarns produced from 100% waste and/or recycled fibers.

The waste from the different categories being used can be blended based on a formula that depends on the specific textile product to be produced, such as a specific yarn, fabric, or garment. Thus, multiple formulas can be used in creating specific blends of waste to create different textile products. Each formula sets out the amount of each category of waste that is added in an opening line to be blended together and then processed to create one or more specific textile product. The formula generally quantifies the amount of waste of each category that can be used to produce a textile product with specific and/or desired characteristics. In some embodiments the characteristics of the textile product to be produced can be quantifiable characteristics such as tensile strength, cover factor, shear, tear strength, or the like.

For example, by blending the categories of waste based on such formulas, the process can result in very good yarn strength from short stable fiber by changing the traditional flow of cotton yarn production. For example, yarns with cotton counts of about 8/1's up to about 40/1's can be created that have excellent strength characteristics. Such yarns that can be produced can then have the flexibility to be dyed in any color, and finished with various chemical additives.

The characteristics of the finish garment or textile can be used determine all aspects of the fiber selection, yarn and fabric production. This is unique because we are blending trash cotton, not first quality fiber. The entire fabric making process, spinning, knitting or weaving, dyeing and finishing are engineered to over compensate strength to the fiber. For example, the waste from the different categories can be selected, cleaned, opened, blended and spun into yarn that can have a strength that exceeds 1900 Count-Strength-Product (CSP) as tested on a LEA strength test CSP Model 600/300, generally on all yarn sizes that can be produced, such as a range of yarns having cotton counts ranging from about 8/1 to about 40/1 or higher. At the same time, due to the selection of waste and the cleaning, opening and blending of the waste fibers, the yarns can be spun using a normal operating speed setting on ring spun, open-end, air-jet or vortex spinning machine instead of having to run at speeds lower than a normal range, for example, below the suggested normal operating speeds of the original equipment manufacturer (hereinafter "OEM"). Thereby, the spinning operation can run at a higher efficiency than what has been expected in spinning operations that incorporate waste fibers.

When spinning the fibers that comprise waste fibers according to the present subject matter, the twist multiples set for the yarns can be different from what is normally expected for specific sizes of yarns. The twist multiples can be chosen such that the resulting yarns are finer, stronger yarns than expected or previously achieved when use waste fiber. The twist multiples are one of the factors in creating strong first quality yarn while using fibers with a mix of short, medium and long stable lengths. For example, the twist multiples used in the spinning operation of the presently disclosed process can exceed normal twist multiples that are used based on a specific average fiber length and yarn count by at least about 30% depending on yarn count.

A focus of the process of the presently disclosed subject matter is on arranging multiple different staple lengths in the same direction so the total when spun together will use the strength of all the fibers. This is a paradigm shift that dramatically expands the general accepted knowledge and practice of producing yarn strength. It is generally accepted in the textile arts that yarn strength is a function of fiber length, fiber strength, parallel positioning of the fibers and twist of the fibers, with primary yarn strength coming from the control of the fiber length and strength. The present process disclosed herein creates high predictable yarn strength from the combination of blending various waste types/fiber lengths/fiber strengths, prioritizing the parallel positioning of the fibers and greatly increasing the twist of the fibers.

The waste fiber is blended depending on the physical properties required by each fabric or garment. A specific formula is created that takes into consideration the sorting percentage by weight of the type of waste fiber or waste cotton material, cleaning techniques, and specific spinning process techniques for each end use textile. The formula for blending trash fiber from different categories, for example, the seventeen (17) categories discussed below, is a unique method of ensuring first quality strength and appearance of the yarns manufactured using these waste fibers and any other textile product produced from these yarns.

FIG. 1 illustrates a flow chart of an embodiment of a regeneration process, generally designated 10 according to the present subject matter. The regeneration process 10 can include the step 12 of collecting different categories of waste cotton material based on different processing areas used in manufacturing cotton textile products. Examples of the categories of waste can include carding waste, opening waste, spinning waste fiber and yarn, combing noils, woven and/or knitted waste fabric, or the like. Depending on the type of waste cotton material collected, the waste cotton can be fed into the one of the next steps. For example, some categories of waste cotton material can be processed through an extraction step 14. For example, step 14 can include running yarn and fabric waste cotton through a garnett machine to separate the cotton material into its fiber form and to clean the cotton material to remove foreign objections. The waste cotton material can be run through the garnetting process multiple times.

The waste cotton fiber produce by the extraction step 14 can be fed along with other cotton waste material such as carding and opening waste and other fiber waste into a horizontal opening step 16 that uses a horizontal opener to further clean and open the waste cotton fibers. The waste cotton can then pass through another opening process of a vertical opening step 18 that uses a vertical opener to additionally clean and separate the fibers. The horizontal opener, or opening line, is different from a vertical opener, or opening line, in that it has components that contain cutting and ripping rollers as well as more traditional opening equipment such as beaters whereas vertical opener generally have traditional opening equipment such as beaters and the like. The horizontal opener can perform cleaning and separating of waste cotton material that still resides in an enhanced state, such as roving and/or yarn. The waste cotton fibers can then be passed through another opening step 20 that further blends, opens and cleans the waste cotton fiber. The waste cotton fiber can then pass through a lap feed unit in step 22 that provides a uniform mat of fibers to a carding process in step 24 in which a card further cleans and aligns the waste cotton fibers being processed. The sliver produced by the carding process can be sent back through steps 16, 18, 20, 22, and 24, for further cleaning before additional processing. The sliver can alternatively be fed to the next step 26 of a drawing process to better align and straighten the fibers and to create more uniform sliver for further processing. The sliver can then be spun into yarn in step 28 in a spinning process that can impart a high twist to the yarn being formed. The subsequent yarn that is produced can then be woven or knitted into a fabric that can be finished, dyed and cut for formation into a textile end product such as a towel, garment, sheeting, or the like.

As disclosed herein, a process for using regenerated cotton to make a textile product is provided. The process includes collecting different categories of waste cotton material from a variety of textile formation processes. The textile formation processes from which waste can be collected can include opening, carding, drawing, roving, combing, spinning, knitting, weaving, dyeing, finishing, and cutting and sewing. As stated below, the different categories of waste cotton material collected can include combed noils, combed waste yarn, ring spinning waste fiber, ring spun waste yarn, carding waste, opening waste, roving waste, open end spinning waste fiber, open end waste yarn, knitting waste yarn, knitting waste fiber, weaving waste fiber, weaving waste yarn, white or natural knit cutting waste, white or natural woven cutting waste, dyed knit cutting scraps, and dyed woven cutting scraps.

The process for using regenerated cotton to make a textile product can include selecting specific categories of waste cotton material to be blended together depending on the textile product to be produced. Textile end products as used herein can include yarn, fabrics, garments, bedding and sheeting products, towels, and the like. As provided in the examples above, different types of end products such as garments constructed of knitted or woven fabrics, bedding and sheeting products, towels, and the like, have different processing and end use requirements and therefore yarns can have different characteristics to meet those processing and end use needs. By understanding different processing and end use requirements of the end textile product and the characteristics of the yarn to be used, a combination of waste cotton material can be selected that incorporates a variety of different categories of waste cotton material to increase the sustainability of the process by using multiple types of waste cotton material, while still achieving an acceptable or exceptional level of strength and durability. For example, the specific categories of waste cotton material to be blended together can be selected by assessing the fiber length and strength of the fibers from the waste cotton material categories to permit a selection of a range of different categories while still creating a strong yarn from a spinning process. In some embodiments, a variance or standard deviation of the fiber length of fibers from the waste cotton material is larger than the variance or standard deviation of fiber length for bale laydowns of virgin cotton commonly used to make yarn.

The process for using regenerated cotton to make a textile product can also include selecting a sequence of cleaning, opening and blending processing steps used in making a yarn depending on the textile product to be produced. Different machinery and/or processes can be used to clean, open and blend the waste cotton material. In fact many of yarn preparation processes and machines do a combination cleaning, opening and/or blending of the fibers from the waste cotton material as well as any other fibers, such as virgin cotton fiber, or synthetic fibers such as polyester, rayon, or the like. The cleaning, opening and blending processing steps can include using at least one of a garnett machine, a horizontal opener, a vertical opener, a carding machine, or a draw frame.

When processing waste cotton material that includes at least one of combed waste yarn, ring spun yarn waste, weaving yarn waste, white or natural knit cutting waste, white or natural woven cutting waste, dyed knit cutting scraps, or dyed woven cutting scraps the waste cotton material can be processed through a garnett machine. It may be desirable to process this waste cotton material through a garnett machine at least two times. For example, such waste cotton material can be processed through a garnett machine three to four times.

The waste cotton material from the garnett machine or from other categories of waste cotton material can be processed through a horizontal opener and vertical opener one or more times. For example, such waste cotton material can be processed through a horizontal opener and vertical opener at least two times. Additionally, the waste cotton material from the garnett machine or from other categories of waste cotton material can be processed through is processed through a carding machine one or more times. For example, such waste cotton material can be processed through a carding machine at least two times. Additionally, to improve the evenness of the sliver from which a yarn is to be spun and to increase the alignment and parallelizing of the fibers therein, the waste cotton material from the garnett machine or from other categories of waste cotton material can be processed through is processed through a draw frame one or more times. For example, such waste cotton material can be processed through a draw frame at least two times.

Further, the process for using regenerated cotton to make a textile product can include processing the blended cotton fibers into the textile product to be produced. The step of processing the blended cotton can include spinning the blended cotton fibers into yarn. The yarn can be spun with a twist multiple that is 15%-20% higher than the standard twist multiple for yarn manufactured from virgin cotton for use in the same end use. The material used to make the textile product can include 100% regenerated waste cotton material. Due to the selection of categories of waste cotton material, and the cleaning, opening, blending such waste cotton material, yarns having a range of a cotton counts can be spun. For example, yarns spun from 100% regenerated waste cotton material can have cotton counts of between about 8/1 to about 40/1, and in some embodiments about 8/1 to about 32/1. These yarns spun from 100% regenerated waste cotton material can have a tensile strength of at least about 1900 CSP. Yarn manufactured using the process disclosed herein has been tested by Bureau Veritas Group located Jamestown, N.Y. (an internationally recognized certification and testing company). Bureau Veritas Group has certified that the yarn tested contained 100% regenerated cotton.

The yarns can be formed into fabrics such as knitted or woven fabrics. The set-up for the knitting or weaving machines can be the same as with traditional cotton yarns spun from virgin cotton. These fabrics can be dyed and finished using traditional methods. Further, these fabrics can be cut and sewn into garments, bedding, sheeting, towels or the like in the conventional manner.

In some embodiments, the regenerated waste cotton material can be mixed with virgin cotton or other fibrous material to make the desired textile end product. The process is flexible in what type of fiber can be additionally added during the cleaning, opening, and blending processes.

Using the processes described above, a textile end product can be provided that can include yarn comprising at least three different categories of waste cotton material that are from textile formation processes. The at least three different categories of waste cotton material can be selected from combed noils, combed waste yarn, ring spinning waste fiber, ring spun yarn waste, carding waste, opening waste, roving waste, open end spinning fiber waste, open end yarn waste, knitting yarn waste, knitting fiber waste, weaving fiber waste, weaving yarn waste, white or natural knit cutting waste, white or natural woven cutting waste, dyed knit cutting scraps, and dyed woven cutting scraps.

A stated above, the yarn can comprise 100% regenerated cotton from waste cotton material. Alternatively, other fibrous material can be added to the regenerated cotton, including synthetic fibers or other natural fibers. For example, virgin cotton can be mixed with the regenerated waste cotton material during cleaning and opening steps to make the textile product.

For yarns made from 100% regenerated cotton, the yarn can have a cotton count of between about 8/1 to about 40/1, and in some embodiments about 8/1 to about 32/1. For yarns made from a mixture of regenerated cotton with other fibrous material, the count counts of the yarns can be even higher. Similarly, the yarn can have a tensile strength of at least about 1900 CSP for yarn spun from 100% regenerated cotton even for higher cotton count yarns. Thick yarns can be expected to have even higher tensile strengths. The Count-Strength-Product (CSP) tensile strength can also be higher for yarns made from a mixture of regenerated cotton with other fibrous material. The yarns can be spun with a twist multiple that is 15%-20% higher than the standard twist multiple for yarn manufactured from virgin cotton for use in the same end use.

The following descriptions provide more detail on examples of different process steps that can be used to create first quality textile products, including yarns, fabrics, and garments according to the present subject matter. These different process steps can include collection of cotton waste, selection of the type of cotton waste to be used in manufacturing the textile products, the cleaning of the waste fibers, the opening and blending of the waste fibers, the carding of the fibers, drawing of the sliver formed from the waste fiber, spinning the fibers into a yarn, fabric formation, dyeing and finishing of the fabric and/or yarns, and garment formation.

Collection of Cotton Waste

The cotton wasted that can be used in the present disclosed processes can include waste from different process areas used in manufacturing cotton yarns and fabrics. The types of cotton waste collected and used in creating a textile product can include, for example, one or more of the seventeen (17) types of waste listed below. Waste Categories that can be collected from different yarn, fabric formation and garment formation waste can include:

1 Combed noil;
2 Combed Waste Yarn;
3 Ring Spinning Waste Fiber;
4 Ring Spun Waste Yarn;
5 Carding Waste;
6 Opening Waste;
7 Roving Waste;
8 Open End Spinning Waste Fiber;
9 Open End Waste Yarn;
10 Knitting Waste Yarn;
11 Knitting Waste Fiber;
12 Weaving Waste Fiber;
13 Weaving Waste Yarn;
14 White or Natural Knit Cutting Waste;
15 White or Natural Woven Cutting Waste;
16 Dyed Knit Cutting Scraps; and
17 Dyed Woven Cutting Scraps.

It can be helpful to have a very high concentration of cotton fiber processing plants available within a small geographic area to have the availability of 17 categories of waste in enough volume to increase the efficiency of the process.

Waste Selection

Waste is selected in specific amounts from the various waste categories and mixed together to produce yarn for a specific end use. For example, a formula that includes the percentage by weight of the type of waste from the various waste categories can be used that is based on characteristics of the yarn to be produced. The formula for each end use can vary greatly depending on the yarn size, and the ultimate physical test requirements of the fabric. For certain products that may be required to meet commercial laundry standards or yarns that are 30/1's or above that may be knitted with Lycra or spandex yarns, the waste cotton can be blended with regular cotton fiber. For example, a 185 gsm tee shirt can be produced from yarns that can comprise a blend of ring spun waste, ring yarn waste and knitting yarn waste.

The term "formula" as used herein can be interpreted as a set of directions similar to a recipe. The "formula" for regenerated yarn made from trash cotton can be a combination of the % blend from the waste cotton and the mechanical processing, to produce the regenerated yarn. The goal is to produce an acceptably high quality and acceptably strong yarn while using a large variety of categories of waste cotton material to increase the efficiency of operation from available waste cotton material and to increase the sustainability of the process from a facilities operation standpoint and a more global environmental standpoint.

In this manner, the process can effectively use all the waste fiber collected, thereby making the process a more truly a sustainable process, that reduces land fill, trash, water consumption, energy, and harmful chemicals used in growing cotton. Thus, while a yarn made from waste cotton material spun from 100% combed noils can exhibit high strength and quality, by understanding the selection process of different categories of waste material, the cleaning, opening and blending processes and the spinning process, a yarn with a mixture of shorter fibers from other categories of waste cotton material can produce an equal or acceptable quality of yarn that meets the needs of the end textile product to be produced. Thus, a wider variety of waste cotton material can be used which can aid the sustainability of the operation making the yarn, since it can pull resources, i.e., waste cotton material, from a variety of sources making its pool of suppliers and available "raw material" much greater. Additionally, by using such a wide variety of waste cotton material, more waste cotton material can be regenerated, i.e., recycled and reused, to increase the positive environmental impact. Some examples of formulas used to manufacture acceptable yarns are provided below.

FIGS. 2A-2D are charts that express formulas of regenerated cotton fibers used to make yarn for different textile end products. FIG. 2A provides, for example, different formulas of regenerated cotton fibers used to make yarns for institution towels that are used for example in hospitals, hotels, or the like. For example, a hospital bathroom towel can comprise 10/1 100% cotton yarn having about 1250 CSP, a 14/1 100% cotton having about 1400 CSP, and a 16/1 100% cotton having about 1400 CSP. The 10/1 100% cotton yarn can comprise about 15% ring spinning waste fiber, about 15% ring spinning waste yarn, about 15% carding waste, about 15% roving waste, about 5% opening waste, about 15% open-end spinning waste fiber, and about 10% white (bleached) knit cutting waste or natural knit cutting waste. The 14/1 100% cotton yarn can comprise about 15% combed noils, about 10% combed waste yarns, about 15% ring spinning waste fiber, about 15% ring spinning waste yarn, about 10% carding waste, about 15% roving waste, about 10% opening waste, and about 10% white (bleached) knit cutting waste or natural knit cutting waste. The 16/1 100% cotton yarn can comprise about 15% combed noils, about 10% combed waste yarns, about 15% ring spinning waste fiber, about 15% ring spinning waste yarn, about 10% carding waste, about 15% roving waste, about 10% opening waste, and about 10% white (bleached) knit cutting waste or natural knit cutting waste.

Similar formulas are provided in FIG. 2A for yarns used in a 86% cotton/14% polyester bath towel that includes 50% virgin polyester in one yarn. Similar formulas are also provided in FIG. 2A for a 100% cotton super soft pile yarn that includes 30% virgin cotton in the yarn. Similarly, formulas are provided in FIG. 2A for yarns used in other 100% cotton hotel bath towels and a 90% cotton/10% polyester bath towel.

FIG. 2B provides, for example, different formulas of regenerated cotton fibers used to make yarns for consumer towels. For example, a 100% cotton standard bath towel can comprise 10/1 100% cotton yarn having about 1800 CSP, a 12/1 100% cotton having about 1600 CSP, and a 14/1 100% cotton having about 1600 CSP. The 10/1 100% cotton yarn can comprise about 40% combed noils, about 30% combed waste yarns, about 20% ring spinning waste fiber, and about 10% ring spinning waste yarn. The 12/1 100% cotton yarn can comprise about 30% combed noils, about 20% combed waste yarns, about 20% ring spinning waste fiber, about 20% ring spinning waste yarn, and about 10% carding waste. The 14/1 100% cotton yarn can comprise about 20% combed noils, about 20% combed waste yarns, about 20% ring spinning waste fiber, about 20% ring spinning waste yarn, and about 20% carding waste.

Similar formulas are provided in FIG. 2B for yarns used in a 100% Cotton microyarn bath towels and super soft pile yarns that include about 30% virgin cotton.

FIG. 2C provides, for example, different formulas of regenerated cotton fibers used to make yarns for knits fabrics used in apparel. For example, a 100% cotton Jersey knit that has a weight of 190 gsm can comprise 20/1 100% cotton yarn. The 20/1 100% cotton yarn can comprise about 40% combed noils, about 30% combed waste yarns, about 10% knitting waste fiber, and about 10% white (bleached) knit cutting waste or natural knit cutting waste. Similar formulas are provided in FIG. 2C for yarns used in other Jersey knit fabrics.

FIG. 2D provides, for example, different formulas of regenerated cotton fibers used to make yarns for woven sheeting fabrics used in apparel and in the hospitality industry. For example, a 100% cotton woven fabric that has a thread count of 160 can comprise 24/1 100% cotton yarn. The 24/1 100% cotton yarn can comprise about 35% combed noils, about 35% combed waste yarns, and about 30% virgin cotton. Similar formulas are provided in FIG. 2D for yarns used in other woven fabrics having other thread counts and using other sized yarns.

Figure 6A:
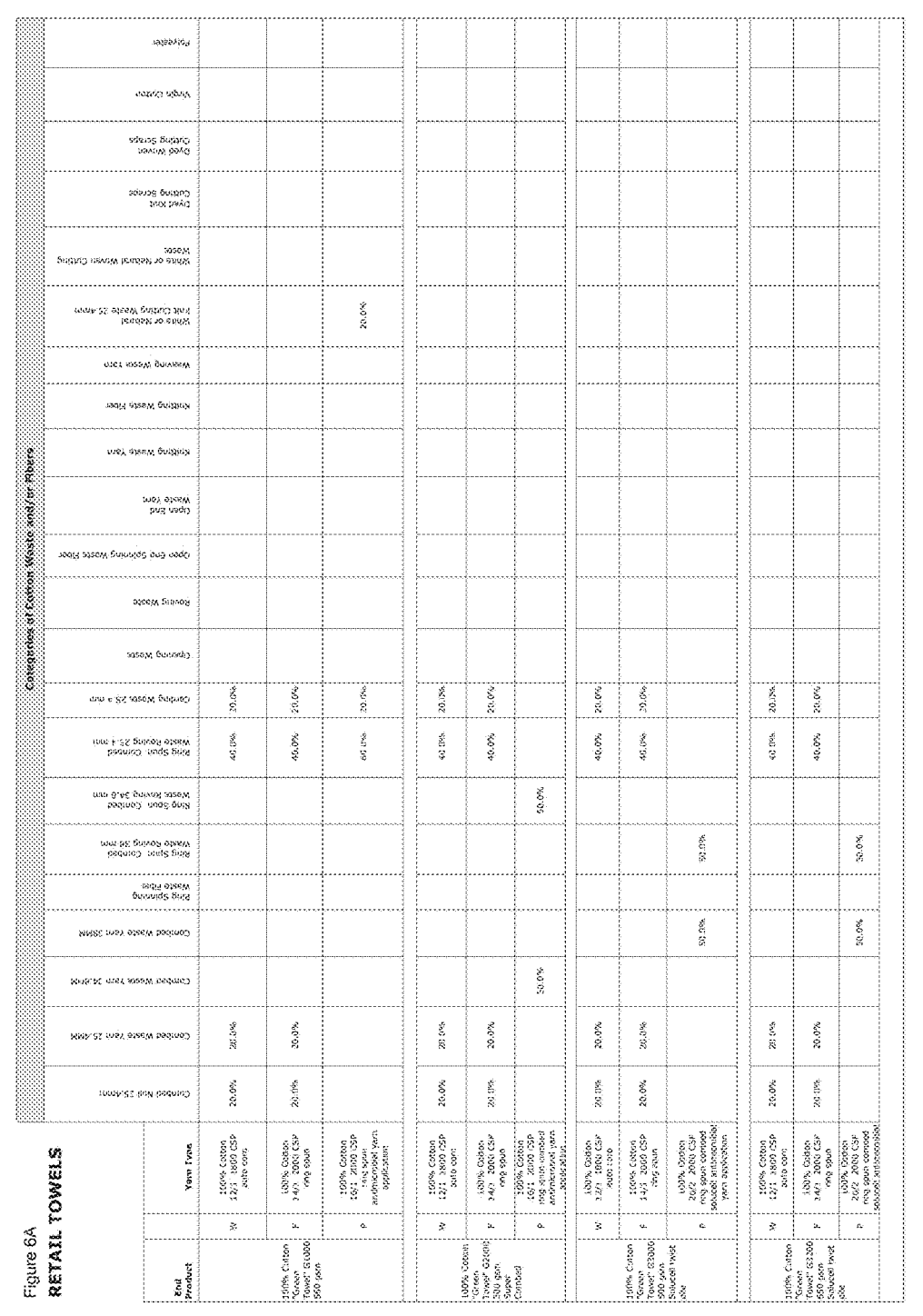

FIGS. 6A-6C are charts that express formulas of regenerated cotton fibers used to make yarn for different textile end products. FIG. 6A provides, for example, different formulas of regenerated cotton fibers used to make yarns for retail towels that are used for example for personal use by consumers. For example, a 100% Cotton "Green Towel" G1000 560 gsm towel can comprise 12/1 100% cotton yarn having about 1800 CSP, a 14/1 100% cotton having about 2000 CSP, and a 16/1 100% cotton having about 2000 CSP (W=warp, F=filling, P=pile). The 12/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 14/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 16/1 100% cotton yarn can comprise about 60% ring spun combed waste roving 25.4 mm, about 20% carding waste 25.4 mm, and about 20% white or natural cutting waste 25.4 mm.

Continuing with FIG. 6A, a 100% Cotton "Green Towel" G2000 500 gsm super combed towel can comprise 12/1 100% cotton yarn having about 1800 CSP, a 14/1 100% cotton having about 2000 CSP, and a 16/1 100% cotton having about 2000 CSP. The 12/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 14/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 16/1 100% cotton yarn can comprise about 50% combed waste yarn 34.8 mm, and about 50% ring spun combed waste roving 34.8 mm.

Continuing with FIG. 6A, a 100% Cotton "Green Towel" G3000 500 gsm Solucell twist pile towel can comprise 12/1 100% cotton yarn having about 1800 CSP, a 14/1 100% cotton having about 2000 CSP, and a 16/1 100% cotton having about 2000 CSP. The 12/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 14/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 16/1 100% cotton yarn can comprise about 50% combed waste yarn 38 mm, and about 50% ring spun combed waste roving 38 mm.

Continuing with FIG. 6A, a 100% Cotton "Green Towel" G3200 650 gsm Solucell twist pile towel can comprise 12/1 100% cotton yarn having about 1800 CSP, a 14/1 100% cotton having about 2000 CSP, and a 16/1 100% cotton having about 2000 CSP. The 12/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 14/1 100% cotton yarn can comprise about 20% combed noil 25.4 mm, about 20% combed waste yarn 25.4 mm, about 40% ring spun combed waste roving 25.4 mm, and about 20% carding waste 25.4 mm. The 16/1 100% cotton yarn can comprise about 50% combed waste yarn 38 mm, and about 50% ring spun combed waste roving 38 mm.

FIG. 6B provides, for example, different formulas of regenerated cotton fibers used to make yarns for knit fabrics for apparel. For example, a jersey 140 gsm fabric can comprise 34/1 combed 100% cotton yarn. A jersey 150 gsm fabric can comprise 30/1 100% cotton yarn. A jersey 160 gsm fabric can comprise 30/1 100% cotton yarn. A pique 185 gsm fabric can comprise 24/1 100% cotton yarn. A pique 220 gsm fabric can comprise 21/1 100% cotton yarn.

As depicted in FIG. 6B, the jersey 140 gsm fabric can comprise about 25% combed waste yarn 38 mm, about 25% combed roving waste 38 mm, about 25% knitting waste yarn combed 38 mm, and about 25% white or natural knit cutting waste combed 38 mm. The jersey 150 gsm fabric and jersey 160 gsm fabric can comprise about 10% combed noil 32 mm, about 30% combed waste yarn 38 mm, about 20% combed roving waste 38 mm, about 20% knitting waste yarn combed 38 mm, and about 20% white or natural knit cutting waste combed 38 mm. The pique 185 gsm fabric can comprise about 20% combed noil 32 mm, about 20% ring spinning waste fiber 32 mm, about 20% combed roving waste 32 mm, about 20% knitting waste fiber, and about 20% white or natural knit cutting waste combed 32 mm. The pique 220 gsm fabric can comprise about 30% combed noil 25 mm, about 30% ring spinning waste fiber 25 mm, and about 40% knitting waste yarn 25 mm.

FIG. 6C provides, for example, different formulas of regenerated cotton fibers used to make yarns for bed sheeting for retail and/or consumers. For example, a T-300 fabric can comprise 60×60 2400 SCP 100% cotton yarn. A T-400 fabric can comprise 60×80 2400 SCP 100% cotton yarn. Both the T-300 and T-400 can comprise about 35% combed waste yarn 38 mm, about 35% roving combed waste 38 mm, and about 30% white or natural knit cutting waste 38 mm.

FIG. 3 is a flow chart that represents an example of a process generally designated 40 to determine formulas for yarns comprising recycled cotton fibers from waste cotton material. First, the type of textile product to be produced can be determined in step 50. For example, it is determined whether to produce sheeting products such as sheets, blankets, table cloths, or the like; towels, such as bath towels, hand towels, beach towels, rags, or the like; or apparel, such as socks, pants, shirts, undergarments, or the like. The characteristics of the end product such as, product use, needed durability, strength, permeability, hand (tactile qualities), or the like, can be considered to facilitate the determination of desired yarn characteristics.

The type of textile product to be made the textile processes involved in making the textile product can be analyzed in step 60. For example, an assessment of each process used in making the textile product can be made to determine the characteristics of the yarn, such as its size, hand (tactile qualities), acceptable hairiness, and strength. Other characteristics can also be considered. In some embodiments of the process, the analysis can be started at the end textile product and each textile process moving back from the end product can be identified and studied to determine the effects of the process on the yarns used to make the textile product. The data from each process can be analyzed and/or synthesized to determine the best combination of characteristics of the yarns that include recycled cotton fibers from waste cotton material used in the textile product. Thus, an overall set of yarn characteristics can be defined in some embodiments.

Based on the desired yarn characteristics, specific categories of waste cotton material can be determined in step 70 that can be selected to be blended together with just waste cotton material or with virgin cotton, polyester or other fiber types. Further, the machine set-ups to process the regenerated cotton waste material can be taken into consideration. The specific percentages of waste cotton material and/or other fibrous material by weight that are to be used can generally comprise the formula. Further, the specific machine set-ups and process parameters in making the yarn can comprise the formula as described herein. Thus, such a formula does not have to be limited by the fiber percentages and fiber selection to achieve specific performance characteristics of the fabric. Adjustments can be made to each of the processes used in manufacturing as part of such formula.

FIG. 4 illustrates an example of processes and related considerations that can be deliberated in determining the percentages of selected waste cotton material and process parameters for producing a textile product that includes regenerated cotton. As shown, the consideration of the different processes and the desired characteristics or qualities of its end textile product can be considered in a top-down manner, i.e., from the end textile product and the last process down to the initial process used to begin the process of creating the end textile product. In some embodiments, the processes can be considered in a different order. Also, in different embodiments, different weights of importance can be assigned to different processes to optimize the characteristics of end textile product.

As show in FIG. 4, a textile product, such a fabric, and its desired characteristics can be considered in determining the specific categories of waste cotton material to be used and the percentage by weight of such specific categories. An assessment of each process used in making the fabric can also be considered too. For example, the expected characteristics of the fabric and yarn used therein needed at the finishing process can be considered. For example, the hand (tactile qualities) and color of the finishing product can impact which categories of waste cotton material are selected. Similarly, the stresses and the ability to absorb and react to the dyes and chemical catalyst are example considerations for a dyeing process.

In fabric formation, the type of fabric formation, for example whether circular or warp knitting or weaving can require different yarn qualities to characteristics, such as hairiness, tensile strength, shear strength, elongation, or the like. When considering weaving, the types of end textile products such as towels, sheeting or apparel can be considered. Towels, for example, can have three different types of yarn (pile, warp, and weft) that perform different functions and can thus have different qualities or characteristics, such as hairiness, tensile strength, shear strength, elongation, or the like, to optimize the associated function of each type of yarn. Thus, the spinning of the yarn can be considered including the type of yarn and the type of twist, whether hard or soft, that may be needed for the types of characteristics the yarn should have for the later process stages that are discussed above and can be considered beforehand.

In the example of FIG. 4, the parameters of the processes of drawing, carding, and dusting that may be desired can be considered based on the characteristic expected from the yarn produced at spinning. For example, whether doubling occurs at drawing (multiple strands of sliver fed through the draw frame) or a single sliver strand is drawn can be a consideration. The speed of the card and the dusting frame can be a consideration in determining the categories of waste cotton material to be selected as well as the expected percentage of short fiber removal and the type of card to be used. Further, the processes of cleaning, blending, opening and extracting can then be considered in making the selection of the categories of waste cotton material and their related percentages by weight to provide a final fiber selection. As stated above, the examples of considerations and their order of deliberation as described in relation to FIG. 4 can be changed, augmented or deviated from as desired or required without deviating from the scope of the subject matter disclosed herein.

Other examples of yarns and fabrics produced by a process for using regenerated cotton to produce a textile product according to the present subject matter are provided below.

EXAMPLE 1

A yarn made from 100% waste cotton fibers that has a cotton count of 24/1 and can be used for a warp yarn in producing a woven bed sheeting. The formula for the waste cotton material and processing steps for making the yarn can be as follows:
Waste Cotton Material
30% ring spinning waste;
30% card waste;
20% weaving yarn waste; and
20% combed waste yarn.
The waste cotton material can then be processed through a first cycle of a horizontal opener, vertical opener, blending, lap feed to card, carding and then a second cycle of a horizontal opener, vertical opener, blending, lap feed, and carding. The waste cotton material now in fiber form within sliver can be sent to a double draw frame, and then to high twist spinning.

EXAMPLE 2

A yarn made from 100% waste cotton fibers that has a cotton count of 24/1 and can be used for a jersey knit fabric. The formula for the waste cotton material and processing steps for making the yarn can be as follows:
Waste Cotton Material
25% combed noils;
25% ring spun waste;
25% knit yarn waste; and
25% natural cut waste.
Processing
The natural cut waste can be put through garnetting with other waste added at the horizontal opener. The waste cotton material can then be processed through a vertical opener, blending, lap feed, carding, double draw frame, and on to high twist spinning.

EXAMPLE 3

A yarn made from 100% waste cotton fibers that has a cotton count of 30/1 and can be used for a jersey knit fabric. The formula for the waste cotton material and processing steps for making the yarn can be as follows:
Waste Cotton Material
30% combed noils;
40% combed yarn waste; and
30% knit yarn waste.
Processing
The yarn waste can be put through garnetting with other waste added and blended at the horizontal opener, vertical opener, blending, lap feed, and/or carding. The waste fibers can then be processed through the double draw frame and on to high twist spinning.
Cleaning Once the categories of waste cotton to be used in making a specific textile product are selected, the waste cotton material needs to be separated into fiber form and cleaned. Depending on the category of waste cotton material, the waste cotton material can be fed into an extractor machine that can remove most of the foreign matter. For example, the waste cotton material can remove approximately 85% of the foreign matter within the waste cotton material. The extractor can be fed manually by an operator who places the waste cotton material into the extractor machine by hand. Alternatively, the waste cotton material can be automatically fed into extractor machine. An example of an extractor machine that can be used is a garnett machine used to garnett waste cotton material into regenerated cotton fibers.

The waste cotton material that is fed into the extractor machine can be, for example, from the category of combed, ring spun, or open end yarn waste, knitting or weaving yarn waste, knit or weaving cutting waste or scraps. However, the waste cotton material that is processed through the extract can be waste fiber material as well. The waste cotton material can be run through the extractor multiple times to ensure that any foreign material is removed and the fibers within the waste cotton material are at least partially separate from each other. For example, the waste cotton material can be processed through about three or four cycles before moving on to Opening. Waste cotton material that is processed through the extractor machine can have virtually any form of foreign material contained therein, including nails, netting, pins, and any type of dirt. In order to make the processing easier and the quality of the yarn used in the desired textile product better, the waste fiber should generally be cleaned as much as possible.

Opening & Blending

The waste fiber that was cleaned and separated by the extractor machine can be fed, for example, by a conveyor, into an opening line, which may include one or more opening machines. The opening machines can include tumbling equipment that further separates and cleans the fibers. The opening line can create high velocity air movement that flows in generally one direction. This airflow within the opening line can begin the initial stages of fiber alignment.

In the opening stage, other categories of waste cotton material can be added or blended into the waste cotton fiber from the extractor machine. The blending of the various waste fiber categories takes place at this time. For example, fiber waste cotton such as combed noils, carding waste, opening waste, roving waste, spinning fiber waste, and/or knitting or weaving fiber wastes can be added to the waste fibers from the extractor machine.

The waste fibers and/or other waste cotton material can be, for example, hand fed to a conveyer that goes into an opening machine in which the fiber cane be further separated by the high velocity air movement. Due to the diversity of the category of waste cotton material, the waste fibers that are contained in the mix have a variety of different staple lengths. For example, the waste cotton material from the combed noils and the spinning fiber waste can be generally be considered to have longer staple lengths than the carding and opening waste or the waste fiber generated from the knitting or weaving fabric waste. With the diversity of staple lengths and the setting of the opening line, the waste fibers are lineate and aligned to facilitate the creation of strength in the yarns to be spun with the fibers. The waste fibers that are generated and used in the presently disclosed process can generally be considered to have a wider variation of and larger variance of staple length than the staple length of the virgin cotton generally used in traditional yarn manufacturing.

As stated above, by using trash fiber, a blend formula can be developed that combines grades of trash fiber for a desired end use. For example, long stable recycle fiber from combing waste, such as combed noils, or knitting waste would be blended with medium stable length fiber from the card, or ring spinning waste to make yarn that has a cotton count of 30/1's. The blend formula can be important to help insure proper consistency of the total yarn. Once the blending is complete, the waste fiber then can be transported to a regular opening line that includes one or more opening machines to be further cleaned. This cleaning can be repeated at least twice before being sent through a feed system to one or more carding machines.

Carding

Once the waste cotton fibers have passed through the one or more opening lines, one or more cards can perform the next cleaning function and can continue linearizing of the staple length fibers and aligning and parallelizing of the fibers. A lap-feeding unit for each card can deliver a generally uniformity mat of fibers from the opening line to the feed roll of the respective card. The card wire used on the respective flats and cylinders of the card can be fine and densely populated. For example, the carding wire is finer than the clothing on a card used on processing traditional cotton. For example, the card clothing on the carding cylinder is 192 points per square inch. Also, the movement of the flats can be increased to 15 revolutions per minute.

Due to the previous processing of the waste fibers, the waste fibers can be considered very clean by the time the waste fibers enter the one or more cards. The cards can generally eliminate any clumps and tufts such as neps as usual, and arrange the fibers in a single linear direction such that the fibers are generally parallel in orientation. After passing through the one or more cards, the waste fibers can be carded again. For example, depending on the quality of the textile product that is desired, the carding sliver can be put back into the open line and run through the card once again. Alternatively, the sliver can be fed into another opening line that feeds a second set of one or more cards. Such double carding is not performed when processing virgin cotton in normal yarn processing. In the case of processing such recycled, or regenerated fiber, double carding can increase the strength and softness of the yarn being produced. The process focuses on arranging multiple different staple lengths of waste fibers in generally the same direction so that the fibers when spun together to strengthen the yarn by using the strength of all the fibers. In the presently disclosed process, when the waste fibers are properly blended, the longer fibers support the shorter fibers.

Drawing

The sliver from the carding process can then be run through a drawing process. The sliver from the carding process can be doubled. "Doubled" as used herein means that two or more strands of sliver can be run through a draw frame. For example, six or eight strands of sliver can be drawn in a draw frames used in the drawing process. This doubling can help make the resulting sliver more uniform and further parallelize the fibers. This improved uniformity of the slivers and more parallelized fibers facilitate the spinning of the sliver into a finer yarn. To help process the waste fibers through a draw frame, the rollers on the frame can run at lower differential speeds than in normal drawing frames that are used in normal processing of virgin cotton. For example, the break draft and the draft in the subsequent draft zones in the draw frame are less than in normal drawing processes. The differential in the roller speeds can be determined by the size of the sliver being produced by the carding process, the number of strands of sliver, and the ultimate yarn size to be spun.

Spinning

The resulting sliver from the drawing process fibers can be used in an open-end spinning. The open-end spinning process can have air streams directed toward the fiber-collecting zone of the spinning rotor as explained below with reference to FIG. 5. The additional force applied to the fibers can create a strengthened yarn. This processing can greatly enhance the yarns uniformity, creating a smooth strong yarn. The speeds of the draw rollers in the open-end spinning frames can run at a higher differential but lower speeds then under normal processing of virgin cotton. The higher differential can cause a higher twist to be imparted to the yarn. For example, depending on the size of the yarn, being produced the twist can be increased by as much as about 15% to about 30%. In some embodiments, the twist can be increased by about 15% to about 20%.

Rotor heads of the rotors used in the open end-spinning machines generally determine the yarn size. Open-end yarn made from regenerated cotton fiber can vary as much as 5%. For example, a setup of an open-end spinning box in an open-end spinning machine that would normally produce a yarn with a cotton count of 20/1 would generally produce a yarn having a cotton count of 21/1 from the regenerated waste fibers. This variation of yarn size due to the use of the waste fiber can be to be factored in when determining actual yarn size to be produced.

As shown below, in Tables 1 and 2, the twist in the yarns created by regenerated cotton fibers, i.e., waste cotton fibers, for both yarns normally used in knitting and yarns normally used in weaving can have an increased twist multiple as compared to the twist multiple of such yarns spun from virgin cotton fibers.

Twist Multiples for Regenerated vs. Standard Yarns

TABLE 1

KNITTING YARNS

| Size | Standard Yarn | Regenerated Yarn | Recycled Content |
|---|---|---|---|
| 8 count | 3.20-3.30 | 3.75 | 100% |
| 10 count | 3.50 | 4.00 | 100% |
| 12 count | 3.50 | 4.20 | 100% |
| 14 count | 3.75 | 4.50 | 100% |
| 16 count | 4.00 | 5.00 | 100% |
| 18 count | 4.25 | 5.30 | 100% |
| 20 count | 4.50 | 5.50 | 100% |
| 24 count | 5.00 | 6.50 | 100% |
| 30 count | 5.50 | 7.00 | 100% |
| 32 count | 6.00 | 7.25 | 100% |

TABLE 2

WARP YARNS

| Size | Standard Yarn | Regenerated Yarn | Recycled Content |
|---|---|---|---|
| 8 count | 3.50-3.60 | 4.75 | 100% |
| 10 count | 4.00-4.20 | 5.30 | 100% |
| 12 count | 4.60-4.80 | 5.75-6.30 | 100% |
| 14 count | 4.85-5.10 | 6.75-7.00 | 100% |
| 16 count | 4.85-5.25 | 7.00-7.25 | 100% |
| 18 count | 4.85-5.40 | 7.10-7.35 | 100% |
| 20 count | 5.00-5.60 | 7.10-7.35 | 100% |
| 24 count | 5.30-5.80 | 7.60-7.80 | 100% |
| 30 count | 6.25-6.50 | 8.75-9.00 | 100% |
| 32 count | 6.40-6.75 | 8.75-9.00 | 100% |

When creating ring spun yarn, the resulting sliver from the drawing process can be processed through a roving process. The roving frames can be set up to increase the amount of twist in the roving as compared to the amount of twist normally inserted into roving made of virgin cotton. For example, a twist that is about 15% to about 20% greater than normal roving created from virgin cotton can be used. Similar to the examples, given above, the twist imparted in the ring spinning process can also be increased as compared to ring spun yarns manufactured from virgin cotton.

Open-end spinning, also known as rotor spinning, can also be a yarn spinning method that creates a yarn that has strength and smoothness when the yarn comprises recycled cotton fibers as described above. FIG. 5 illustrates an open-end spinning station generally designated 100 that comprises a spin box (not shown) in which a rotor 102 (partially shown) is placed. Rotor 102 can be spun in a known manner at higher speeds, for example between about 5,000 and about 90,000 r.p.m. Sliver 104, which can comprise recycled cotton fibers and can be formed, for example, in a drawing process, can be pulled from a can 106 through a trumpet 108 by a feed roller 110 that can feed sliver 104 to a combing roller 112. Combing roller 112 can pull sliver 104 apart into individual fibers (not shown).

Air can be provided through air intake ducts 114 and 116 to create an airflow that can carry the individual fibers through a transport channel 118 and into the spin box. Transport channel 118 can feed the individual fibers into a groove 102A within rotor 102. As rotor 102 spins at a high velocity, the individual fibers form a yarn within groove 102A which can be pulled from the rotor 102 and the spin box through a withdrawal tube 122 through the aid of withdrawal rollers 124. Yarn 120 is then wound onto a cone or tube 126 by a drum 128 to form a package 130.

To take into consideration the variances in strength expected in spinning with at least a portion of recycled/regenerated cotton fibers, the spin boxes for spinning recycled/regenerated cotton fibers within each open-end spinning frame can be configured to operate differently from spin boxes that are configured to spin purely virgin cotton fibers into yarn. The following are measurements of fiber and yarn attributes related to open-end spinning:

$N_{fd}$=number of fibers in the air duct
$V_{fd}$=fiber velocity in the air duct
$N_{fy}$=number of fibers in yarn cross-section
$V_{fy}$=yarn velocity The following is an equation that can be useful in predicting yarn strength:

$$\frac{N_{fy}}{N_{fd}} = \frac{V_{fd}}{V_{fy}}$$

The equation summarizes a phenomenon called doubling that can be useful for spinning recycled cotton fibers. The effect of the air draft can be a reduction of the fiber strand down to just a few fibers, which then can land on the inside surface (at groove 102A) of rotor 102 to be spun into yarn 120. It can take many layers of fiber to make up the sufficient amount of fibers per yarn cross-section. As successive layers of fibers are laid into the surface of the rotor 102, a doubling action occurs. This action can even out irregularities in recycled cotton yarn 120.

A normal formula for the equation provided above stated in the 1998 EFS conference on Cotton Blending is as follows:

$$1/1=1/1$$

The amount of doubling in rotor spinning (or open-end spinning) can be estimated by the ratio $N_{fy}/N_{fd}$. Thus, an increase in the number of fibers in the yarn and/or a reduction in the number of fibers in the air duct can enhance the uniformity of the yarn.

For spinning yarn from recycled/regenerated cotton fibers in an open-end spinning frame, the doubling effect can be increased by reducing the number of fibers in transport channel 118. The reduction of the fibers in transport channel 118 is determined by the formula of the fibers chosen and the required strength, and velocity of the yarn exiting the rotor.

For example for spinning a yarn from a 100% recycled/regenerated cotton fibers, the equation can be expressed as follows:

$$1/0.5=2/1$$

Once the intended yarn is created from the waste cotton fibers for the desired textile product, the yarn can be used in a fabric formation process.

Knitting

The resulting yarns can be, for example, used to create a knit fabric. The knitting process can be different types of knitting, such as warp knitting, circular knitting, or the like. Different types of circular knits can be produced using the yarns created using the waste cotton fibers such as jersey knit, interlock knit, double knit, etc. The machine set-up for the different types of knitting machines can be generally same as when using regular yarn spun from virgin cotton fibers. Some changes to the set-up of the knit machines can be done to compensate for the use of yarns spun from the waste cotton fibers. In some embodiments, when knitting with yarns created using the waste cotton fibers as described above, the feed system for feeding the yarns into the knitting machine can be tensionless. The yarn feed system can start from a side creel and feed, preferably through plastic guides, to a tension rotator then to the needle feed. Additionally, the cylinder of a circular knitting machine can rotate at lower RPMS than when such knitting machine is knitting most equivalent fabrics using yarn spun from virgin cotton fibers. Such measures can be taken to reduce the stress placed on the yarns spun from the waste cotton fibers so as not to weaken the yarns.

Weaving

The resulting yarns spun from the waste cotton fiber can also be, for example, used to create a woven fabric. The resulting yarns can be used as both warp yarns and filling, or weft, yarns. For warp yarns, the resulting yarns can be run through a slashing process to apply sizing to the warp yarns. The amount of sizing applied can be controlled so that only enough size is used to enhance the strength of the yarn for efficient weaving.

Any number of different weaving machines can be used to weaving the resulting yarns into a fabric. Generally, any type of loom or weaving machine that can weave yarns spun from virgin cotton can also be used to weave the yarns spun from the waste cotton fibers. For example, jacquard looms, airjet looms, rapier looms, shuttle looms, projectile looms, or the like, can be used.

The tension on the uptake of the warp yarns to the shed can be adjusted to maximize the fabric strength. Such a setting generally should not be over looked when setting up the loom. Yarn made from the regenerated cotton can act differently than regular yarns made from virgin cotton, and the tension balance between uptake from warp beam to the shed, and the fabric beam can be adjusted accordingly to each fabric. The fabric, for example, woven from yarns spun from such waste cotton material can have weights between about 135 gsm and about 900 gsm.

Knitting and Weaving

As a general statement about the yarns spun from the waste cotton fibers as described herein, these yarns are strong enough for knitting and weaving processes. The yarns even have the strength needed for warp yarns and for high speed shuttleless loom filling yarns. These yarns can be used in either the knitting or weaving fabric formation for a range of yarn sizes. For example, the cotton counts of the yarn can range from about 8/1 to about 34/1. Thus, lighter fabric woven from yarns having cotton counts of about 20/1 to about 34/1 can be produced.

Table 3 below illustrates the tensile strength of fabric made with the yarn produced in the presently disclosed process. Three terry towels that were produced from yarn spun from waste cotton fibers were tested. The fabric tensile strengths on the towels after fifty cycles well exceeded the required 40 pounds of force in the warp direction, and 30 pounds of force in the fill direction per ASTM D-5034.

TABLE 3

FABRIC TENSTILE STRENGTH
(Pounds Force)

| Initial (Prior to Wash/Dry) | | After 25 Wash/Dry Cycles | | After 50 Wash/Dry Cycles | | Weight in ounces | Weight in grams |
|---|---|---|---|---|---|---|---|
| 10/1 Warp | 12/1 Fill | 10/1 Warp | 12/1 Fill | 10/1 Warp | 12/1 Fill | per sq. yard | per sq. meter |
| 82.20 | 62.40 | 79.80 | 71.00 | 86.20 | 67.40 | 19.19 | 650.24 |
| Initial (Prior to Wash/Dry) | | After 25 Wash/Dry Cycles | | After 50 Wash/Dry Cycles | | Weight in ounces | Weight in grams |
| 20/1 Warp | 24/1 Fill | 20/1 Warp | 24/1 Fill | 20/1 Warp | 24/1 Fill | per sq. yard | per sq. meter |
| 68.50 | 52.06 | 66.51 | 55.10 | 70.21 | 56.30 | 9.74 | 330.00 |
| Initial (Prior to Wash/Dry) | | After 25 Wash/Dry Cycles | | After 50 Wash/Dry Cycles | | Weight in ounces | Weight in grams |
| 30/1 Warp | 30/1 Fill | 30/1 Warp | 30/1 Fill | 30/1 Warp | 30/1 Fill | per sq. yard | per sq. meter |
| 55.00 | 41.25 | 53.35 | 45.50 | 57.10 | 45.20 | 6.64 | 225.00 |

Dyeing and Finishing

After fabric formation, fabric softeners can be applied during the finishing process. The fabric can be dyed with virtually any dyestuff including, reactive, pigment, direct dyes in any application including pressure and beck dyeing. All standard-finishing processes can be applied on standard finishing machinery. The fabrics produced accordingly to the present disclosure can be generally dyed and finished as other fabrics, even lighter fabric formed from lighter yarns. For example, fabrics that have been produced with yarns having a cotton count of about 14/1 and above can withstand normal dyeing and finishing. The fabrics can be dyed in any color and can be finished with all mechanical methods generally in use today.

To reduce the environmental impact of cotton textile production, the dyeing and finishing plants used to finish the fabrics can be configured to recycle 96% of the water used in the respective processes and can be configured to reuse the steam energy produced. All dyes and chemicals can be GOTS approved.

End Products and Garments

Once the fabrics are formed and processed, the fabrics can be used to form textile end products, such as towels, garments, bedding materials and sheets, or the like. Sewing requirements for the fabrics described herein are the exactly the same as for fabrics produced from regular virgin cotton.

The garments that are produced for garment dyeing can withstand all garment dyeing, washing, and enzyme washing procedures.

It will be understood that various details of the subject matter described herein may be changed without departing from the scope of the subject matter described herein. Furthermore, the foregoing description is for the purpose of illustration only, and not for the purpose of limitation.

What is claimed is:

1. A process for using recycled waste cotton material to produce a ring spun yarn, the process comprising:
collecting different categories of waste cotton material from a variety of textile formation processes;
determining parameters of each process used in making the ring spun yarn to be produced to determine characteristics for each yarn used in the ring spun yarn to be produced;
assessing a fiber length and strength of the fibers from the waste cotton material categories collected;
selecting specific categories of waste cotton material to be blended together depending on the ring spun yarn to be produced, the characteristics for each yarn used in the ring spun yarn to be produced, and the length and strength of the fibers from the waste cotton material categories;
selecting a sequence of cleaning, opening and blending processing steps used in making a yarn depending on the ring spun yarn to be produced;
cleaning the selected specific categories of waste cotton material;
opening and blending the selected specific categories of waste cotton material into blended waste cotton fibers; and
processing the blended waste cotton fibers into the ring spun yarn to be produced,
wherein waste material used in making the ring spun yarn comprises: about 20% combed noil 25.4 mm, about 20% combed waste yarn 25.4 mm, about 40% ring spun combed waste roving 25.4 mm, and about 20% carding waste 25.4 mm; or about 60% ring spun combed waste roving 25.4 mm, about 20% carding waste 25.4 mm, and about 20% white or natural cutting waste 25.4 mm; or about 50% combed waste yarn 34.8 mm, and about 50% ring spun combed waste roving 34.8 mm; or about 50% combed waste yarn 38 mm, and about 50% ring spun combed waste roving 38 mm.

2. The process according to claim 1, wherein the ring spun yarn produced has a cotton count of greater than about 15/1 to about 40/1.

3. The process according to claim 1, wherein 100% of material used in making the ring spun yarn comprises waste cotton material.

4. A process for using recycled waste cotton material to produce a ring spun yarn, the process comprising:
- collecting different categories of waste cotton material from a variety of textile formation processes;
- determining parameters of each process used in making the ring spun yarn to be produced to determine characteristics for each yarn used in the ring spun yarn to be produced;
- assessing a fiber length and strength of the fibers from the waste cotton material categories collected;
- selecting specific categories of waste cotton material to be blended together depending on the ring spun yarn to be produced, the characteristics for each yarn used in the ring spun yarn to be produced, and the length and strength of the fibers from the waste cotton material categories;
- selecting a sequence of cleaning, opening and blending processing steps used in making a yarn depending on the ring spun yarn to be produced;
- cleaning the selected specific categories of waste cotton material;
- opening and blending the selected specific categories of waste cotton material into blended waste cotton fibers; and
- processing the blended waste cotton fibers into the ring spun yarn to be produced,
- wherein waste material used in making the ring spun yarn comprises: about 25% combed waste yarn 38 mm, about 25% combed roving waste 38 mm, about 25% knitting waste yarn combed 38 mm, and about 25% white or natural knit cutting waste combed 38 mm; or about 10% combed noil 32 mm, about 30% combed waste yarn 38 mm, about 20% combed roving waste 38 mm, about 20% knitting waste yarn combed 38 mm, and about 20% white or natural knit cutting waste combed 38 mm; or about 20% combed noil 32 mm, about 20% ring spinning waste fiber 32 mm, about 20% combed roving waste 32 mm, about 20% knitting waste fiber, and about 20% white or natural knit cutting waste combed 32 mm; or about 30% combed noil 25 mm, about 30% ring spinning waste fiber 25 mm, and about 40% knitting waste yarn 25 mm.

5. The process according to claim 4, wherein the ring spun yarn produced has a cotton count of greater than about 15/1 to about 40/1.

6. The process according to claim 4, wherein 100% of material used in making the ring spun yarn comprises waste cotton material.

7. A process for using recycled waste cotton material to produce a ring spun yarn, the process comprising:
- collecting different categories of waste cotton material from a variety of textile formation processes;
- determining parameters of each process used in making the ring spun yarn to be produced to determine characteristics for each yarn used in the ring spun yarn to be produced;
- assessing a fiber length and strength of the fibers from the waste cotton material categories collected;
- selecting specific categories of waste cotton material to be blended together depending on the ring spun yarn to be produced, the characteristics for each yarn used in the ring spun yarn to be produced, and the length and strength of the fibers from the waste cotton material categories;
- selecting a sequence of cleaning, opening and blending processing steps used in making a yarn depending on the ring spun yarn to be produced;
- cleaning the selected specific categories of waste cotton material;
- opening and blending the selected specific categories of waste cotton material into blended waste cotton fibers; and
- processing the blended waste cotton fibers into the ring spun yarn to be produced,
- wherein waste material used in making the ring spun yarn comprises: about 35% combed waste yarn 38 mm, about 35% roving combed waste 38 mm, and about 30% white or natural knit cutting waste 38 mm.

8. The process according to claim 7, wherein the ring spun yarn produced has a cotton count of greater than about 15/1 to about 40/1.

9. The process according to claim 7, wherein 100% of material used in making the ring spun yarn comprises waste cotton material.

* * * * *